May 27, 1941.　　H. DALLMANN ET AL　　2,243,475
FLUID METER
Filed July 16, 1936
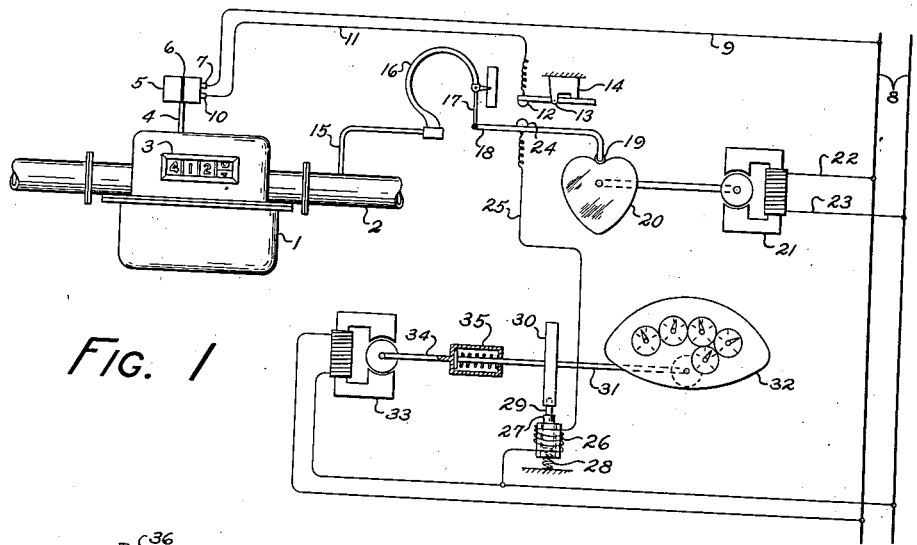
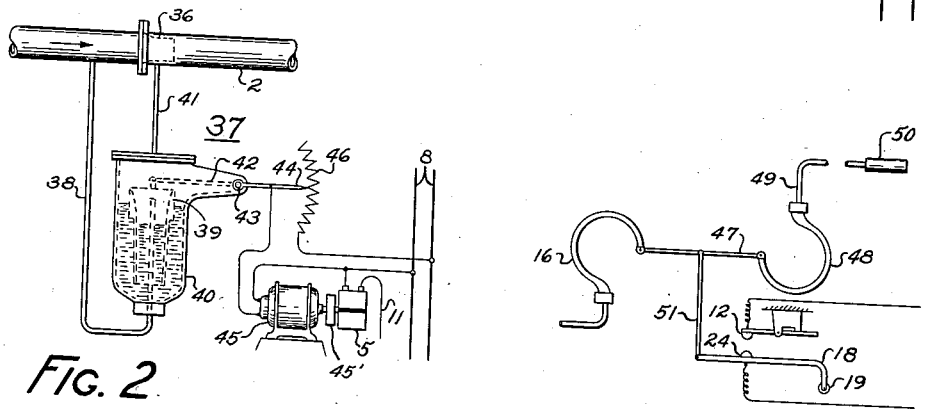
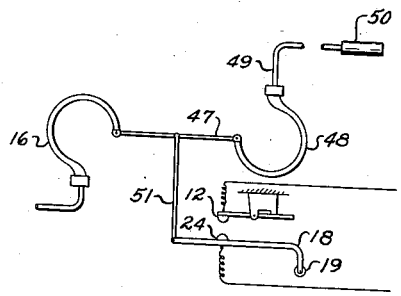
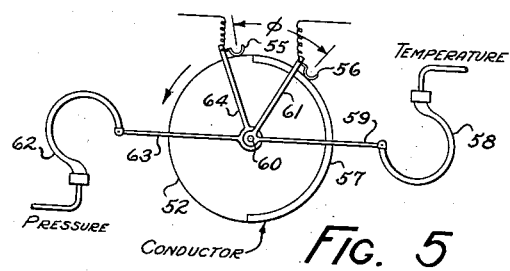
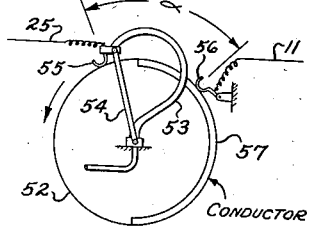
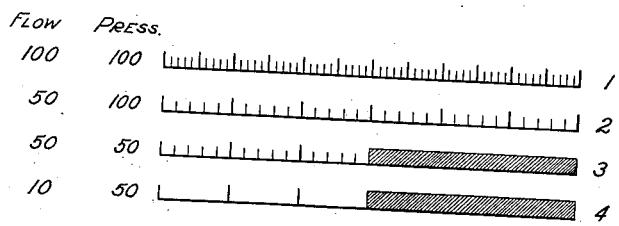
INVENTORS
HERBERT DALLMANN
HERMANN RAGNAR EGGERS
BY
Raymond W. Junkins
ATTORNEY Patented May 27, 1941

2,243,475

UNITED STATES PATENT OFFICE 2,243,475

FLUID METER

Herbert Dallmann, Berlin-Karlshorst, and Hermann Ragnar Eggers, Berlin, Germany, assignors to General Electric Company, a corporation of New York Application July 16, 1936, Serial No. 90,928
In Germany October 21, 1935

16 Claims. (Cl. 73—206)

This invention relates to devices for integrating a variable with respect to an independent variable, and more particularly to means for compensating said devices for variations in a condition or conditions affecting the primary measurement of the variable. Thus in the integration of the rate of flow of a fluid through a conduit over a period of time, changes in conditions of the fluid such as pressure or temperature, will affect the accuracy of the primary rate measurement, resulting in a like error in the integrated results unless proper compensation is employed.

One object of our invention is to provide a compensator for an integrator of the type wherein momentary impulses having a frequency dependent upon the then existing magnitude of the variable being measured produce a definite movement of a register or other exhibiting means.

It is a further object of our invention to provide a device arranged to compensate for variations in any one of a plurality of conditions which affect the primary rate measurement.

It is still another object of our invention to provide a compensating device readily adapted for use with a wide variety of metering devices.

These and further objects will be apparent from the following description and from the drawing in which:

Fig. 1 is a diagrammatic illustration of one embodiment of our invention.

Fig. 2 illustrates an alternate form of primary metering device which may be used in place of that shown in Fig. 1.

Fig. 3 illustrates a mechanism for compensating for variations in a plurality of conditions.

Fig. 4 illustrates an alternate form of compensating mechanism.

Fig. 5 illustrates a modified form of the compensating mechanism shown in Fig. 4 arranged to compensate for variations in a plurality of conditions.

Fig. 6 is an explanatory graph of the principle of operation of our invention.

In Fig. 1 we have chosen to illustrate and describe our invention as applied to the measurement of the rate of flow of a fluid. As known, the total volume of a fluid passing through a conduit in a given length of time is conveniently and accurately measured by a positive displacement meter which has as a primary element a chamber or chambers through which the fluid passes in successive isolated quantities. These quantities may be separated from the stream and isolated by alternately filling and emptying compartments of known capacity, and fluid cannot pass through without actuating the primary device. Such meters are usually provided with a self-contained secondary element normally consisting of a counter with suitably graduated dials for indicating the total quantiy that has passed through the meter up to the time of reading. Such counters, however, give the total quantity in terms of volume, and if it is desired to determine the total quantity in terms of weight, it is necessary to correct the readings in accordance with variations in the density of the flowing fluid caused by changes in pressure and/or temperature or other conditions. In accordance with our invention we provide means for substantially instantaneously correcting the readings of the register for variations in conditions affecting the density of the flowing fluid, so that the correct quantity in terms of weight may be readily ascertained from the register at any instant.

Referring to Fig. 1, we have therein shown a positive displacement meter 1 positioned in a pipe or conduit 2 for measuring the flow of fluid therethrough. The meter 1 may be provided with a suitable self-contained secondary device such as a register 3, from which the total flow in volume units passing through the pipe 2 up to the time of reading may be ascertained.

Arranged to be driven at a speed dependent upon the rate of flow of fluid through the conduit 2 from a suitable shaft or gear (not shown) within the meter 1 is a shaft 4 carrying at its upper end a drum 5 in the surface of which is embedded a conducting strip 6 running parallel with the axis of the drum.

Frictionally engaging the surface of the drum 5 is a brush 7 connected to one side of a source 8 through a conductor 9. Likewise frictionally engaging the surface of the drum 5 is a brush 10 connected by a conductor 11 to a contact 12 pivotally supported at 13 and held against further rotation in a counterclockwise direction by a stop 14. When the conducting strip 6 is rotated to engage the brush 7 the brush 10 will likewise be engaged, permitting current from the source 8 to pass to the contact 12.

Connected to the conduit 2 through a suitable pipe 15 is a pressure sensitive Bourdon tube 16, the free end of which is positioned in a counter-clockwise direction proportional to increases in pressure of the fluid within the conduit 2. Pivotally connected to the free end of the Bourdon tube 16 by a link 17 is a member 18, the other end of which is provided with a roller 19 forming a follower for a cam 20 rotated at constant speed by a synchronous motor 21 connected to the source 8 through conductors 22 and 23.

The member 18 carries a contact 24 adapted to engage the contact 12 during a portion of each oscillation of the member 18 by the cam 20. It is apparent that the higher the pressure within the conduit 2 the greater portion of the time the contact 24 will be in engagement with the contact 12 and that at some predetermined maximum design pressure the contact 24 may be in engagement with the contact 12 continuously or for some predetermined maximum increment of time. As the pressure within the conduit 2 decreases, causing the Bourdon tube 16 to be positioned in a clockwise direction, the increment of time of each revolution of the cam 20 that the contact 24 will be in engagement with the contact 12 will decrease. By proper shaping of the cam 20 any functional relation desired may be obtained between pressure and time of engagement of the contacts 24—12.

Connected to the contact 24 by a conductor 25 is a solenoid 26 having a plunger 27 normally urged upwardly, as viewed in the drawing, by a spring 28. With the contact 24 in engagement with the contact 12 engagement of the contact strip 6 with the brushes 7 and 10 completes the circuit for the solenoid 26 across the source 8. Energization of the solenoid 26 serves to position the plunger 27 downwardly.

Carried by the plunger 27 is a pin 29 normally held in a notch or socket in the rim of a wheel 30 secured to a driven shaft 31 operatively connected to a register 32. A self starting synchronous motor 33 energized from the source 8 is arranged to drive the register 32 through a driving shaft 34 and a friction clutch 35. With the pin 29 in the socket provided in the rim of the wheel 30, the driven shaft 31 and register 32 are held against rotation by the shaft 34. However upon energization of the solenoid 26 moving the plunger 27 downwardly and removing the pin 29 from the socket, the register 32 will be driven through the friction clutch 35 by the driving shaft 34. Operation of the register 32 at any desired speed may be obtained by the inclusion of self-contained reduction gears (not shown) as well known in the art.

Each revolution of the shaft 4 and drum 5 is representative of a certain quantity of fluid passing through the conduit 2. Accordingly, each revolution of the drum 5 should produce a certain predetermined advancement of the register 32. With the contact 24 in engagement with the contact 12 it is apparent that, upon the contact strip 6 engaging the brushes 7 and 10, a momentary electric impulse for energizing the solenoid 26 will result. This momentary energization will serve to remove the pin 29 from the socket in the rim of the wheel 30, thereby permitting actuation of the register 32 by the motor 33. Disengagement of the brushes 7 and 10 with the contact strip 6 will not immediately stop actuation of the register 32, as the socket within the rim of the wheel 30 will now be out of alignment with the pin 29 which will merely bear against the rim until one complete revolution of the wheel 30 has been completed, when it will again enter the socket and further actuation of the register 32 will cease until there is a further engagement of the brushes 7 and 10 with the contact strip 6. Assuming that the density of the fluid within the conduit 2 remains constant, it is apparent that the advance in reading of the register 32 over a period of time will be proportional to the total flow of fluid through the conduit 2 during that period of time. If, however, the density of the flowing fluid varies due to changes in pressure and/or temperature, or other conditions affecting the density, it is apparent that while the advance in the register 32 will be proportional to the total volume of fluid passing through the conduit 2 during that period of time it will not be proportional to the total weight unless proper correction is made for such variations in density.

Proper compensation for variations in density of the fluid flowing through the conduit 2 is made by the intermittent closure of contacts 24 and 12, for referring to Fig. 6, which illustrates in graphical fashion the principle of operation of our invention, at 100% flow and 100% design pressure 60 momentary impulses due to closure of the brush 7 with the brush 10 through the contact strip 6 may occur during a revolution of the cam 20. Likewise the cam 20 may be arranged so that throughout the oscillation of the member 18 the contact 24 is in engagement with the contact 12, thereby permitting every electrical impulse to be effective for energizing the solenoid 26 and subsequent operation of the register 32. If the flow reduces to 50% while the pressure remains at 100% of that for which the meter 1 was designed, then the speed of the shaft 4 will be half that which it was previously so that during one revolution of the cam 20 only 30 momentary impulses will be transmitted through the solenoid 26. Thus over the same period of time the register 32 will advance but half the amount it did when the flow was at 100%. If now the pressure within the conduit 2 should reduce to approximately 50% of that for which the meter 1 was designed, the Bourdon tube 16 would be positioned a proportional amount in a clockwise direction, thereby lowering the beam 18 so that during a portion of each revolution of the cam 20 the contact 24 would be out of engagement with the contact 12. Impulses originating through engagement of the brushes 7 and 10 with the contact strip 6 will then be ineffective for energizing the solenoid 26, so that throughout the increment of time when the contact 24 is out of engagement with the contact 12 the register 32 will remain stationary. Thus, as shown in the third illustrative example in Fig. 6, but fifteen impulses will be effective for causing actuation of the register 32 during the same interval of time; and accordingly over any given period of time the register 32 will advance proportionately. As shown in the fourth illustrative example if the pressure should remain constant at 50% of that for which the meter 1 was designed, but the flow should reduce to 10%, then during the interval of time represented by one complete revolutiton of the cam 20 but three impulses would be effective for momentarily energizing the solenoid 26.

In this description of the operation of our invention we have assumed that there is a direct proportion between variations in pressure and the correction necessary in order to properly compensate the readings of the register 32 for such changes. It will be apparent, however, that the cam 20 may be shaped as desired, so that any functional relation desired will exist between variations in pressure and the increment of each revolution of the cam 20 when the contact 24 will be disengaged from the contact 12, thereby making it possible to correct the readings of the register 32 for any functional relation which may exist between variations in pressure and variations in density.

Referring now to Fig. 2 we therein show an alternate form of primary metering device for producing a speed of the drum 5 proportional to the rate of flow of fluid through the conduit 2. Therein we show positioned in the conduit 2 a restriction, in this illustrative embodiment a flow nozzle 36, for producing a differential pressure bearing a functional relation to the rate of flow of fluid through the conduit 2. The differential pressure produced by the restriction 36 may be measured by a rate of flow meter 37 which may be of the type shown and described in Patent 1,064,748 to Ledoux.

Connected to the conduit 2 on the inlet or upstream side of the restriction 36 is a pipe 38 leading to the interior of a bell 39 partially submerged in a liquid such as mercury within a casing 40. Connected to the conduit 2 on the outlet or downstream side of the restriction 36 is a pipe 41 leading to the interior of the casing 40 but to the exterior of the bell 39. Pivotally connected to the bell 39 is a lever 42 secured to an oscillatable spindle 43 journaled in the casing 40 and to which a contact arm 44 is secured.

The bell 39 having a wall of material thickness is vertically positioned within the casing 40 in accordance and the wall of the bell 39 is properly shaped so that vertical movement thereof is directly proportional to variations in the rate of flow of fluid through the conduit 2, so that movements of the contact arm 44 are directly proportional to variations in rate of flow.

The drum 5 is shown connected to the shaft of a variable speed motor 45 through gears 45': The motor is connected to the source 8 through a resistance 46 and contact arm 44. With no flow through the conduit 2 and the bell 39 in its lowermost position, substantially all of the resistance 46 will be effective in the circuit of the motor 45, causing it to remain stationary. As the flow through the conduit 2 increases, effecting a vertical positioning of the bell 39, the amount of resistance 46 in circuit with the motor 45 will progressively decrease, thereby causing proportionate increases in speed so that the drum 5 will rotate at a speed proportional to the rate of flow of fluid through the conduit 2. It is apparent that the resistance 46 may be shaped to give any desired increments of speed change of the drum 5 for given increments of increase in the rate of flow through the conduit 2.

The rate of flow through the conduit 2 may be expressed by the formula:

$$W = k\sqrt{h \times D}$$

where

W = rate of flow in pounds per hour
k = a constant
h = differential pressure produced by the restriction 36
D = density From this formula it is apparent that if the total flow of fluid through the conduit 2 over a period of time is to be determined from the rate of flow meter 37 it is necessary that proper compensation be provided for variations in density. It is further apparent that changes in density caused by variations in pressure will be properly compensated for by the embodiment of our invention illustrated in Fig. 1. Inasmuch as a functional relation exists between changes in density (and accordingly changes in pressure) and the rate of flow of fluid through the conduit 2, the cam 20 will desirably be provided with a predetermined shaped contour so that the register 32 will give the correct total flow over a period of time in units of weight.

In Figs. 1 and 2 we have illustrated certain embodiments of our invention for properly compensating a flow meter for variations in pressure of the flowing fluid. In some cases it is desirable that variations in temperature of the flowing fluid likewise be effective for modifying the actuation of a register such as indicated at 32 to properly compensate the reading for changes in density effected by such changes in temperature. In Fig. 3 we show a modified arrangement whereby the register 32 may be properly compensated for both variations in pressure and temperature.

Referring to Fig. 3 we therein show the Bourdon tube 16 pivotally connected to a horizontal differential beam 47 also pivotally connected to a Bourdon tube 48 which is connected by means of a capillary 49 to a bulb 50. As known, the bulb 50 may be inserted in the conduit 2 and the entire system comprising the Bourdon tube 48, capillary 49 and bulb 50 being filled with a gas, vapor or liquid the pressure therein will vary in accordance with changes in temperature of the fluid within the conduit 2 to effect a proportionate positioning of the Bourdon tube 48. As increases in temperature of the flowing fluid generally indicate decreases in density, the Bourdon tube 48 is arranged to position the beam 47 in opposite direction than the Bourdon tube 16.

Pivotally connected to the mid point of the beam 47 is a vertical link 51 connected to the member 18. Increases in pressure as indicated by counterclockwise positioning of the Bourdon tube 16 are effective for positioning the member 18 about the roller 19 in a clockwise direction, thereby increasing the increment of each revolution of the cam 20 during which the contact 24 is in engagement with the contact 12. Increases in temperature of the flowing fluid within the conduit 2 are effective for positioning the Bourdon tube 48 in a counterclockwise direction, thereby angularly positioning the member 18 about the roller 19 in a counterclockwise direction, decreasing the increment of each revolution of the cam 20 during which the contact 24 is in engagement with the contact 12.

In Fig. 4 we illustrate an alternate form of compensating mechanism comprising a drum 52 continuously rotated at any desired constant speed in the direction shown by the arrow by any suitable source of motive power (not shown). Axially aligned with the drum 52 is a Bourdon tube 53 sensitive to pressures within the conduit 2.

Pivotally connected to the free end of the Bourdon tube 53 and to the stationary end axially aligned with the drum 52 is a link 54. Increases in pressure will accordingly serve to position the free end of the Bourdon tube 53 angularly about the outer surface of the drum 52. Carried by the free end is a contact 55 normally engaging the outer surface of the drum 52 and connected to the conductor 25. Also engaging the outer surface of the drum 52 is a contact 56 connected to the conductor 11.

Upon increases in pressure within the conduit 2 the Bourdon tube 53 will be positioned in a clockwise direction, thereby decreasing the distance between the contact 55 and contact 56, and the angle α formed by the contact 55, the stationary end of the Bourdon tube 53 and contact 56. As shown, approximately 180° of the outer surface of the drum 52 is conducting as illustrated at 57. When the conducting portion is in engagement with both the contacts 55 and 56, impulses originating through rotation of the shaft 4 (Fig. 1) will serve to actuate the register 32. When, however, only one or neither of the contacts 55 and 56 are in engagement with the conducting portion 57 such impulses will not be effective for producing actuation of the register 32. As the pressure within the conduit 2 increases, positioning the Bourdon tube 53 in a clockwise direction, it is apparent that the increment of each revolution of the drum 52 during which the conducting portion 57 will be in engagement with both the contact 55 and contact 56 will increase proportionately, thereby increasing the number of impulses which will be transmitted from the drum 5 to the solenoid 26. Decreases in pressure serve to increase the angle α, decreasing the increments of each revolution of the drum 52 during which impulses originating through the agency of the drum 5 and brushes 7 and 10 will be effective for controlling actuation of the register 32. It is apparent therefore that the arrangement illustrated in Fig. 4 will be effective for properly compensating the register 32 for variations in density of the fluid flowing within the conduit 2 caused by changes in pressure of such fluid.

In Fig. 5 we show a modified form of the compensating apparatus disclosed in Fig. 4, wherein the contact 56 is positioned angularly about the drum 52 in accordance with variations in temperature of the flowing fluid within the conduit 2 as indicated by changes in the position of a Bourdon tube 58. The Bourdon tube 58 is shown pivotally connected to a bell crank 59 pivotally supported at 60 and having an arm 61 carrying the contact 56.

Variations in pressure within the conduit 2 are effective for positioning a Bourdon tube 62 pivotally connected to a bell crank 63, supported at 60 and having an arm 64 carrying the contact 55. We have indicated the angle formed by the contact 55, support 60 and contact 56 as φ. Increases in pressure within the conduit 2 are effective for decreasing the angle φ, whereas decreases in pressure cause proportionate increases in the angle φ. Correspondingly, increases in temperature of the fluid within the conduit 2 effect proportionate increases in the angle φ, whereas decreases in temperature cause proportionate decreases. It is apparent therefore that the increment of each revolution of the drum 52 during which the contacts 56 and 55 will simultaneously engage the conducting strip 57 will vary in accordance with changes in pressure and inversely in accordance with changes in temperature, and that the apparatus illustrated in Fig. 5 will thereby compensate the actuation of the register 32 so that at all times it will indicate the correct total flow of fluid through the conduit 2 up to the time of reading.

While in accordance with the patent statutes we have illustrated certain preferred embodiments of our invention it is to be understood that we are not to be limited thereby, but that reference should be had to the appended claims rather than the description to determine the scope of our invention.

What we claim as new, and desire to secure by Letters Patent of the United States, is:

1. In a fluid meter, in combination, means for producing electrical impulses of a frequency proportional to the rate of fluid flow, means for determining the magnitude of a condition of the flow fluid, a register, electromagnetic means under the control of said electric impulses for effecting an actuation of said register, and means controlled by said second named means for periodically preventing a number of said impulses from exercising a control of said electromagnetic means in accordance with the magnitude of said condition.

2. In a mechanism for integrating the rate of flow of a fluid with respect to time, in combination, a meter of the rate of flow, an electric motor, means including a member positioned by said meter for varying the speed of said motor in accordance with the rate of fluid flow, means operated by said motor for establishing momentary electric contact impulses at a frequency dependent upon the speed of said motor, exhibiting means, means under the control of said impulses for normally producing an actuation of said exhibiting means of predetermined amount, and means sensitive to a condition of said fluid for periodically rendering said impulses ineffective for producing an actuation of said exhibiting means for an increment of time in accordance with the magnitude of said condition.

3. In a mechanism for integrating the rate of flow of a fluid with respect to time, in combination, a meter of the rate of flow, means actuated by said meter for establishing momentary electric impulses at a frequency dependent upon the rate of fluid flow, a member positioned in accordance with the magnitude of a condition of the fluid, time responsive means for regularly moving said member through a cyclic course, a register, a constant speed electric motor for driving said register, a clutch between said register and motor, locking means for normally preventing actuation of said register by said motor, electromagnetic means under the control of said electric impulses for disengaging said locking means to permit an actuation of predetermined amount of said register, and contact means actuated by said member for periodically rendering said impulses ineffective to control said electromagnetic means.

4. In a mechanism for integrating the rate of flow of a fluid comprising means for establishing momentary electric impulses at a frequency dependent on the then existing rate of flow, integrating mechanism actuated by said impulses, means for compensating the integration for variations in a condition of the fluid which affects said integration comprising means for selectively rendering said impulses effective or non-effective to accomplish said integration in accordance with the magnitude of said condition, which includes a rotatable disc having a rim partially conducting and partially non-conducting, a stationary contact in engagement with said rim, a movable contact in engagement with said rim, and means for positioning said second contact toward or away from said first contact in accordance with the magnitude of said condition.

5. In a mechanism for integrating the rate of flow of a fluid, in combination, means for establishing momentary electric impulses at a frequency proportional to the then existing rate of fluid flow, a register, electromagnetic means under the control of said impulses for producing an actuation of said register of predetermined amount, means for compensating the integration for variations in a plurality of conditions of said fluid comprising a revoluble surface partially conducting and partially non-conducting, a plurality of movable contacts engaging said surface, means for positioning each of said contacts about said surface in accordance with the magnitude of one of said conditions, and an electric circuit including said impulse establishing means, said contacts and said electromagnetic means.

6. In combination, exhibiting means, means responsive to the rate of flow of a fluid, means actuated by said last named means for producing momentary electric impulses at a frequency depending upon the rate of fluid flow, means under the control of said impulses for normally producing an actuation of said exhibiting means, and means sensitive to pressure and temperature of said fluid for periodically preventing a number of said impulses from producing an actuation of said exhibiting means in accordance with the magnitude of said pressure and temperature.

7. In combination, exhibiting means, means responsive to the rate of flow of a fluid, means actuated by said last named means for producing momentary electric impulses at a frequency dependent upon the rate of fluid flow, means under the control of said impulses for normally producing an actuation of said exhibiting means, and means sensitive to density conditions of said fluid for periodically preventing a number of said impulses from producing an actuation of said exhibiting means in accordance with the magnitude of said density conditions.

8. In a mechanism for integrating a variable with respect to a plurality of independent variables, in combination, means for producing electric impulses having a frequency dependent upon the magnitude of the variable, a register, means under the control of the frequency of said impulses for producing an actuation of said register of predetermined amount, and means for periodically preventing a number of said impulses from producing an actuation of said register in accordance with the magnitude of a plurality of independent variable conditions under which said variable is measured.

9. In a telemetric transmitter, flow responsive means initiating electric impulses of uniform duration but of a frequency varying with rate of fluid flow, and circuit interrupting means sensitive to a condition of said fluid for periodically preventing the transmission of some of said impulses.

10. A telemetric system comprising in combination, a transmitter for telemetering signals at a frequency corresponding with rate of fluid flow, means sensitive to a variable condition of said fluid for periodically nullifying some of said signals, and a remote receiving exhibitor under the control of the frequency of those signals originated by said transmitter which are not nullified.

11. In a fluid meter, in combination, means for producing electric impulses of a frequency proportional to the rate of fluid flow, means for determining the magnitude of a condition of the fluid, exhibiting means, electromagnetic means under the control of said electric impulses for effecting an actuation of said exhibiting means, and means controlled by said second named means for periodically preventing a number of said impulses from exercising a control of said electromagnetic means in accordance with the magnitude of said condition.

12. In a fluid meter, in combination, means for producing electric impulses of a frequency proportional to the rate of fluid flow, exhibiting means, electromagnetic means under the control of said electric impulses for effecting an actuation of said exhibiting means, and means sensitive to a plurality of conditions of said fluid for periodically preventing a number of said impulses from exercising a control of said electromagnetic means in accordance with the magnitude of said conditions.

13. In a fluid meter, in combination, means for producing electric impulses of a frequency proportional to the rate of fluid flow, means for determining the magnitude of the pressure of the fluid, exhibiting means, electromagnetic means under the control of said electric impulses for effecting an actuation of said exhibiting means, and means controlled by said second named means for periodically preventing a number of said impulses from exercising a control of said electromagnetic means in accordance with the magnitude of said pressure.

14. In a fluid meter, in combination, means for producing electric impulses of a frequency proportional to the rate of fluid flow, means for determining the magnitude of the temperature of the fluid, exhibiting means, electromagnetic means under the control of said electric impulses for effecting an actuation of said exhibiting means, and means controlled by said second named means for periodically preventing a number of said impulses from exercising a control of said electromagnetic means in accordance with the temperature of the fluid.

15. In combination, means for producing electric impulses of a frequency in accordance with the rate of flow of a fluid, exhibiting means, electromagnetic means under the control of said electric impulses for effecting an actuation of said exhibiting means, means for modifying the control of said electromagnetic means by said impulses to correct for variations in a condition affecting the rate measurement of said fluid flow comprising means for periodically preventing a number of said impulses from exercising a control of said electromagnetic means in accordance with the existing magnitude of said condition.

16. In a telemetric transmitter for transmitting a quantity, means sensitive to a variable varying in predetermined functional relationship with the magnitude of the quantity for producing electric impulses at a frequency varying with the magnitude of the variable, and means for compensating for changes in the functional relationship between the variable and quantity from the predetermined relationship comprising circuit interrupting means periodically preventing the transmission of said impulses for increments of time corresponding to changes in the functional relationship from the predetermined relationship.

HERBERT DALLMANN.
HERMANN R. EGGERS.